(12) United States Patent  (10) Patent No.: US 8,545,770 B2
Viovy et al.  (45) Date of Patent: Oct. 1, 2013

(54) METHOD FOR IMPROVING THE BONDING PROPERTIES OF MICROSTRUCTURED SUBSTRATES, AND DEVICES PREPARED WITH THIS METHOD

(75) Inventors: Jean-Louis Viovy, Paris (FR); Jeremie Weber, Paris (FR); Debjani Paul, Cambridge (GB); Laurent Malaquin, Linas (FR); Sandrine Miserere, Pantin (FR)

(73) Assignees: Institue Curie, Paris (FR); Centre Nationale de Recherche Scientifique, Paris (FR); Fluigent Paris-Biotech-Faculte de Medecine, Paris (FR)

( * ) Notice: Subject to any disclaimer, the term of this patent is extended or adjusted under 35 U.S.C. 154(b) by 471 days.

(21) Appl. No.: 12/448,169

(22) PCT Filed: Dec. 11, 2007

(86) PCT No.: PCT/IB2007/055031
§ 371 (c)(1),
(2), (4) Date: Jan. 12, 2010

(87) PCT Pub. No.: WO2008/072187
PCT Pub. Date: Jun. 19, 2008

(65) Prior Publication Data
US 2010/0104480 A1  Apr. 29, 2010

Related U.S. Application Data

(63) Continuation-in-part of application No. 11/636,623, filed on Dec. 11, 2006, now abandoned.

(51) Int. Cl.
*B01L 3/00* (2006.01)

(52) U.S. Cl.
USPC ............................................. 422/502

(58) Field of Classification Search
USPC ............................................. 422/502
See application file for complete search history.

(56) References Cited

U.S. PATENT DOCUMENTS 5,900,160 A * 5/1999 Whitesides et al. ............ 216/41
5,932,799 A   8/1999 Moles
(Continued)

FOREIGN PATENT DOCUMENTS

DE  42 35 182 A1  11/1993
GB     1145595    3/1969
(Continued)

OTHER PUBLICATIONS

Hazarika, Pompi et al., "Fabrication of Submicron Scale Patterned Plastic Thin Film Fluidic Devices with Controllable Thickness," Lab Chip, vol. 3, pp. 128-131 (2003).
(Continued)

*Primary Examiner* — Lore Jarrett
(74) *Attorney, Agent, or Firm* — Oliff & Berridge, PLC

(57) ABSTRACT

A method for treating the surface of a polymerio substrate, including the following steps: providing a first polymeric substrate; contracting at least one part of one face of the first substrate with some liquid solvent system, the liquid solvent system containing at least a first volatile compound and at least a second compound having a low molecular weight and able to swell and/or soften the polymeric material forming the face; letting at least the volatile compound to evaporate from the face of the first substrate and; contracting the so-treated face of first substrate with a third material.

15 Claims, 3 Drawing Sheets

A

B

(56) References Cited

U.S. PATENT DOCUMENTS

| | | | |
|---|---|---|---|
| 6,096,656 A * | 8/2000 | Matzke et al. | 438/702 |
| 6,126,765 A | 10/2000 | Ohman | |
| 6,322,753 B1 | 11/2001 | Lindberg et al. | |
| 6,375,871 B1 | 4/2002 | Bentsen et al. | |
| 6,503,359 B2 | 1/2003 | Virtanen | |
| 6,620,478 B1 | 9/2003 | Ohman | |
| 6,761,962 B2 | 7/2004 | Bentsen et al. | |
| 6,787,015 B2 | 9/2004 | Lackritz et al. | |
| 6,836,156 B2 | 12/2004 | Chien | |
| 6,838,156 B1 | 1/2005 | Neyer et al. | |
| 2001/0035351 A1 * | 11/2001 | Simpson et al. | 204/453 |
| 2002/0050220 A1 * | 5/2002 | Schueller et al. | 101/486 |
| 2002/0139270 A1 | 10/2002 | Nitzan et al. | |
| 2002/0170825 A1 | 11/2002 | Lee et al. | |
| 2003/0054716 A1 | 3/2003 | Chou et al. | |
| 2003/0150555 A1 | 8/2003 | Gandhi et al. | |
| 2003/0213382 A1 * | 11/2003 | Kendale et al. | 101/41 |
| 2005/0029708 A1 | 2/2005 | Coyle | |
| 2005/0089449 A1 | 4/2005 | Polwart et al. | |
| 2005/0095602 A1 | 5/2005 | West et al. | |
| 2005/0205136 A1 | 9/2005 | Freeman | |
| 2006/0237080 A1 * | 10/2006 | Jon et al. | 137/883 |

FOREIGN PATENT DOCUMENTS

| | | |
|---|---|---|
| GB | 1295162 | 3/1970 |
| WO | WO 03/010289 A2 | 2/2003 |
| WO | WO 2007/021813 A2 | 2/2007 |

OTHER PUBLICATIONS

De Mello, Andrew, "Plastic Fantastic?," Lab Chip, vol. 2, pp. 31N-36N (2002).

Rohr, Thomas D. et al., "Surface Functionalization of Thermoplastic Polymers for the Fabrication of Microfluidic Devices by Photoinitiated Grafting," Advanced Functional Materials, vol. 13, No. 4, pp. 264-270 (2003).

Ramsey, Jeremy D. et al., "High-Efficiency, Two-Dimensional Separations of Protein Digests on Microfluidic Devices," Analytical Chemistry, vol. 75, No. 15, pp. 3758-3764 (Aug. 2003).

Paegel, Brian M. et al., "Turn Geometry for Minimizing Band Broadening in Microfabricated Capillary Electrophoresis Channels," Analytical Chemistry, vol. 72, No. 14, pp. 3030-3037 (Jul. 2000).

Hu, Shuwen et al., "Surface Modification of Poly(dimethylsiloxane) Microfluidic Devices by Ultraviolet Polymer Grafting," Analytical Chemistry, vol. 74, No. 16, pp. 4117-4123 (Aug. 2002).

Fu, L.M. et al., "Electrokinetic Injection Techniques in Microfluidic Chips," Analytical Chemistry, vol. 74, No. 19, pp. 5084-5091 (Oct. 2002).

Liu, Shaorong et al., "Optimization of High-Speed DNA Sequencing on Microfabricated Capillary Electrophoresis Channels," Analytical Chemistry, vol. 71, No. 3, pp. 566-573 (Feb. 1999).

Koutny Lance et al., "Eight Hundred-Base Sequencing in a Microfabricated Electrophoretic Device," Analytical Chemistry, vol. 72, No. 14, pp. 3388-3391 (Jul. 2000).

Becker, Holger et al., "Polymer Microfluidic Devices," Talanta, vol. 56, pp. 267-287 (2002).

Barbier, Valessa et al., "Comb-like Copolymers as Self-Coating, Low-Viscosity and High-Resolution Matrices for DNA Sequencing," Electrophoresis, vol. 23, pp. 1441-1449 (2002).

Abgrall, Patrick et al., "A Novel Fabrication Method of Flexible and Monolithic 3D Microfluidic Structures Using Lamination of SU-8 Films," Journal of Micromechanics and Microengineering, vol. 16, pp. 113-121 (2006).

Lide, David R. et al., "Physics $79^{th}$ Edition," CRC Press, pp. 15.14-15.18 (1998).

Paul, Debjani et al., "Lamination-based Rapid Prototyping of Microfluidic Devices Using Flexible Thermoplastic Substrates," Electrophoresis, vol. 28, p. 1115-1122 (2007).

Pallandre, Antoine et al. "New 'monolithic' templates and improved protocols for soft lithography and microchip fabrication." *Journal of Physics*, May 10, 2006, pp. S665-S676., vol. 18, No. 18.

Abgrall, Patrick et al. "A novel fabrication method of flexible and monolithic 3D microfluidic structures using lamination of SU-8 films." *Journal of Micromechanics and Microengineering*, Jan. 2006, pp. 113-121, vol. 16, No. 1.

* cited by examiner

METHOD FOR IMPROVING THE BONDING PROPERTIES OF MICROSTRUCTURED SUBSTRATES, AND DEVICES PREPARED WITH THIS METHOD

This application is the U.S. national phase of international application No. PCT/IB2007/055031, which is a Continuation-In-Part of co-pending U.S. application Ser. No. 11/636,623 filed Dec. 11, 2006, which is incorporated by reference in its entirety.

BACKGROUND OF THE INVENTION

Year after year, microfluidic devices appear more clearly as a valuable alternative to conventional systems for numerous applications. Several commercial systems are already on the market, and their potential applications increase steadily. There are, however, a number of application that seem to resist this trend. For the detection of point mutations in DNA by heteroduplex analysis, for instance, earlier studies demonstrated that the resolution depends critically on the length of the capillary used in separation, because the difference in mobility between two duplex DNA fragments with the same length and a single by mismatch is very minute. Recently, innovative matrices could increase this difference, and allow highly reliable separations in bench-top DNA sequencers, but this performance could be achieved in 50 cm long capillaries only. In order to transpose this protocol to microchip format, without compromising the resolution obtained with 50 cm long capillaries, both sharp injection bands and long (10-20 cm) separation channels are required. As recited in Liu, S. et al., (Anal. Chem. 1999, 71, 566-573) another application that requires long channels is DNA sequencing on a chip with high read-lengths. Ramsey, (Anal. Chem. 2003, 75, 3758-3764) disclosed a design, in which they have addressed the problem of fabricating long channels by introducing serpentine or spiral geometries. However, the presence of turns in such geometries introduces band dispersion ("racetrack effect"), as described in Paegel, et al. (Anal. Chem. 2000, 72, 3030-3037(.

Koutney, et al, (Anal. Chem. 2000, 72, 3388-3391) describe a glass-based DNA sequencing chip with a 40 cm long straight separation channel, which solves this problem of channel length. However, this device requires complex lithographic steps (e.g. specialized spin-coating, direct UV-laser writing, wet chemical etching and thermal bonding). This makes the construction and operation costs of such chips extremely high. Also these large microchannel arrays are difficult to manipulate.

For lab-on-chips to find their way into routine clinical analysis, the microdevices must be inexpensive, disposable and easy to fabricate, while retaining the high resolution performances of state-of the art devices based on long glass capillaries. There is thus a strong need of proposing a low cost process, allowing the fabrication of microfluidic systems comprising microchannel networks, involving at least one long microchannel, typically of length 10 cm and larger. There is also a need to prepare robust, easy to manipulate and compact devices comprising microchannel networks involving at least one long microchannel without sharp turns detrimental to resolution.

To fulfil the requirement of low cost and ease of fabrication, polymers and plastics are increasingly replacing traditional microfluidic substrates like silicon and glass in diagnostic applications. Some examples of such devices are reviewed in Becker, et al., (Talanta 2002, 56, 267-287). Due to the same reason, standard lithographic fabrication of devices is giving way to "soft lithography" or replication-based methods, (e.g. mold casting, nano-imprinting, thermoforming, hot-embossing, etc.) in which a large number of devices can be replicated in a short time from a single master. The company Gyros, for instance, discloses in U.S. Pat. No. 6,126,765 and U.S. Pat. No. 6,620,478 devices able to accommodate straight channels about 5 cm long by arranging all the channels along the radius and transporting liquids using centrifugal flow, and methods of fabrication for such devices. These devices are fabricated by injection molding of thermoplastics in a format compatible with that of optical CDs and DVDs, thus making them very inexpensive in mass production by injection molding. The length available in a CD format is still insufficient for high resolutions sequencing, however. Laboratory-scale replication methods (e.g. mold casting of elastomers or hot-embossing of thermoplastics using a press) are not convenient either for fabricating long straight channels.

Hence it is important to develop new strategies for fabrication of long channels in plastic substrates, compatible both with laboratory scale and industrialisation.

Another emerging area of micro fluidics is the fabrication of devices in thin polymer substrates to yield "flexible" chips. This technology has the potential of allowing low-cost fabrication in a lamination process, as recited e.g. in U.S. Pat. No. 6,761,962 to Bentsen, or in US 2005/0089449 to Polwart. In contrast with hot embossing or injection molding, in which the substrate is fully enclosed in a container, and can thus be raised above its glass transition for an arbitrary length of time in order to allow for an accurate reproduction of the microstructure of the mold, continuous microfabrication processes based on lamination raise specific and difficult problems. As a solution to these problems, Bentsen, U.S. Pat. No. 6,761,962, proposed to deliver the substrate as a liquid that is dye casted onto a supporting layer with a higher glass transition. Once the microstructures imprinted into the substrate, the latter is solidified by crosslinking or cooling. This, however, makes the fabrication complex, and restricts the number of materials that can be used. It also raises problem of adhesion between the substrate and the supporting layer. U.S. Pat. No. 6,761,962 also propose that microstructures be imprinted into a preformed sheet of material by hot embossing on a molding roll. However, a thin flexible substrate cannot be raised globally above its glass transition and kept under tension, since it would deform or even break. No example of microstructures made by this way were presented in the above patent. U.S. Pat. No. 6,838,156 to Neyer, proposes a solution to this problem, consisting in heating the substrate in the vicinity of the microstructures, using high energy radiation to locally heat the master. This requires, however, that the molding device be at least partially transparent to said radiation, which is not convenient for industrial processes. US 2005/0089449 to Polwart, in contrast, use a method based on high pressure plastic film forming. This method, however, is limited to very thin films, thus requiring an additional supporting case, and it is also limited to relatively large microstructures, of order 100 µm. Finally, in J. Micromech. Microeng. 2006, 16, 113-121, Abgrall, et al. demonstrates the fabrication of flexible 3D microfluidic networks in the photosensitive resin SU-8. However, this photocurable resin requires serial processing and relatively long curing and developing, rendering it inadequate for cost-effective mass production.

It would thus be very beneficial to propose new methods, able to facilitate the accurate reproduction of microstructures or nanostructures in sheetlike substrates, and in particular in flexible, thin ones.

The choice of the right material for the development of high resolution microfluidic DNA electrophoresis devices is also critical and non trivial, since the chosen material should combine optical qualities approaching those of glass or ideally fused silica, for optimal detection, surface properties avoiding biomolecules adsorption and electroosmosis, and amenability to good replication of micron-sized structures. Polydimethylsiloxane (PDMS), polymethylmethacrylate (PMMA), polycarbonate (PC), polystyrene (PS), polyimide, cyclic olefin copolymer (COC), and polyethylene (PE) are some of the common polymeric materials used to fabricate chips (reviewed in Becker, et al., Talanta 2002, 56, 267-287). Among these, PDMS is the most popular substrate for soft lithography due to its low affinity for biomolecules and cells, transparency in the UV region (which allows integration of optical detection modules) and easy sealing of devices (both reversibly and irreversibly). However, PDMS also suffers from certain disadvantages, such as, swelling in organic solvents (thus limiting the range of microfluidic applications), low mechanical strength (leading to sagging of high-aspect ratio structures in the device) and unstable surface treatments. Oxidized PDMS becomes hydrophobic in air within 30 minutes, thereby not being able to prevent non-specific adsorption of molecules on the surface of the device. Generally speaking, it is very important to be able to achieve a surface treatment of a polymeric material used for the fabrication of a microsystem or of a microfluidic system, in order to bond some reactive species such as biological ligands or enzymes, to prevent unwanted adsorption of species, or to modify the wettability of said surfaces. Numerous methods have been proposed in the art, as reviewed e.g. by Rohr et al. (Adv. Funct. Mat., 2003, 13, 264-270). Hu et al. describes in Anal. Chem. 2002, 74, 4117-4123 a method for grafting polymer onto the polymer PDMS, thanks to UV activation of said PDMS. In this method, the PDMS was contacted with an aqueous solution containing $NaIO_4$, benzyl alcohol, and acrylic monomer, and the polymerization of the acrylic polymer was photoinitiated. This method, however, does not lead to a treatment that is very stable in time, and it leads to imperfect surface treatment. For instance, a good surface treatment with a neutral polymer such as polyacrylamide should lead to an electroosmotic flow as low as $10^{-5}$ cm$^2$/Vs, whereas only around $1.10^{-4}$ cm$^2$/Vs were achieved with this method. Cyclo-olefin copolymer (COC) is another promising plastic substrate for microfluidic devices due to its chemical resistance to acids, bases and most polar solvents (De Mello, A., Lab Chip 2002, 2, 31N-36N). Cyclo-olefin polymer devices fabricated by different techniques such as injection molding, micromilling, thermal nanoimprint lithography and hot-embossing using a press have been disclosed, e.g. in U.S. Pat. No. 6,787,015 to Lakcritz.

However, due its chemical inertness, this polymer is not easily amenable to surface treatment and bonding. This is also true for many other polymers interesting for microfluidic systems such as, as an examplary list, polyolefins, fluoropolymers, polyesters, and the like. More generally, bonding materials presenting microstructures or nanostructures without altering these structures remains a challenge.

It would thus be useful to propose methods able to induce an efficient surface treatment onto a wide variety of polymers, in particular but not exclusively, chemically inert, difficult to functionalize or elastomeric ones.

Another challenge in the fabrication of embedded microstructures such as microchannels, is the closing of microchannels. Typically, microchannels are fabricated in two steps. In a first step, recessed microstructures corresponding to the microchannels are prepared in one substrate, by a technique known by those skilled in the art such as casting, photolithography, hot embossing, injection molding, micromilling, photoablation, plasma ablation, powder blasting, and the like. In a second step, a second substrate, which may optionally also bear microstructures, is bonded onto the first substrate to close the channel. This bonding can be achieved by chemical means or by physical means. A widely used means for bonding two substrates in order to create embedded microchannels consists in using an intermediate adhesive layer. Optionally, this intermediate layer can be of the "stencil" type, i.e. it may carry holes or slots crossing the whole layer, that will constitute the wanted microchannels after bonding of one substrate to each of the sides of said stencil. US 2005-0205136 A1 to Freeman, for instance, proposes such an approach. A disadvantage of this method, however, is that the lateral walls of the microchannel are of a different chemical nature as the top and bottom walls. A widely used way to bond two polymeric substrates is thermal bonding. In this case, it was proposed to introduce between the two substrates to be bonded a layer of "hot melt" type, or more generally of a thermoplastic material with a deformation temperature smaller than that of the surfaces to bond, as disclosed e.g. in U.S. Pat. No. 6,126,765 to Ohman et al. In that case, however, the bottom and top surfaces of the microchannel have different chemical natures. U.S. Pat. No. 6,503,359 to Virtanen proposes another method using chemical bonding. U.S. Pat. No. 5,932,799 to Moles proposes a method specific for systems made in polyimide, using so called "self-bonding" polyimide. This polyimide contains additives such as Sn that stimulate thermally excited chemical crosslinking between the surfaces to be bonded. All of the above methods for bonding two substrates in order to create an embedded microchannel, however, share the inconvenient, that they cannot lead to a microchannel with uniform surface properties around its perimeter. This is very detrimental to numerous applications, in particular those involving the transport in the microchannels, of species that tend to adsorb on the microchannel surfaces. This is also very disadvantageous to electrophoretic separation methods, or more generally to electrokinetic transport, because differences in surface properties lead to inhomogeneous electroosmosis, which in turn lead to dispersion.

US 2003/0150555 A1 to Gandhi proposes an other method, in which one of the two substrates to be bonded have different glass transitions. In this case, one can generally achieve surface properties that are relatively uniform, because the difference in glass transition can be achieved by changes in molecular weight, which do not change significantly the surface properties. However, in this method, in contrast with e.g. U.S. Pat. No. 6,838,156, thermal bonding implies that one of the polymer substrates to be bonded is brought above its glass transition. It is thus very difficult to keep microstructures intact: if the substrate carrying microstructures is the one with the lowest glass transition, the structures will tend to collapse during bonding. In contrast, if the layer with the lowest glass transition is a planar cover substrate, it will tend to flow into the microstructures, and also lead to an alteration of the wanted microchannel characteristics. This problem is particularly serious for the fabrication of thin-film systems. For instance, sub-micron features have been reported to be patterned on spin-coated polystyrene films which could be peeled off and folded, but without being sealed (Hazarika et al. Lab Chip 2003, 3, 128-131). The preparation of sealed, thin microfluidic systems is disclosed in US 2005-0089449, but the microstructures prepared were rather large, and the systems prepared this way do not present uniform surface properties all around the microchannel perimeter.

So, there is a strong need to develop low-cost, high throughput methods for preparing embedded microchannels or microstructures with substantially uniform surface properties.

It is thus an object of the present invention, to propose low-cost, robust and flexible microfluidic systems comprising embedded microstructures such as one or several long microchannels.

It is another object of the invention to achieve such goal without introducing along said microchannel sharp turns.

It is also an object of the invention to propose improved methods suitable for fabricating microsystems with embedded microchannels or microstructures at a low cost.

In particular, it is a further object of the invention to propose improved methods for treating the surface of a sheetlike substrate.

As one of its advantages, the invention allows the easy fabrication of microsystems that would have been either impossible or very difficult to produce with prior art. Thus, it is also an object of the invention to propose large, flexible, integral microsystems comprising at least one embedded microchannels network, wherein said network involves at least one long microchannel.

SUMMARY OF THE INVENTION

In a first aspect, the invention provides a method for treating the surface of a polymeric substrate, in particular a microfluidic polymeric substrate, comprising at least the steps of:

a/ providing a first polymeric substrate, b/ contacting at least one part of a face of said first substrate with some liquid solvent system, said liquid solvent system containing at least a first volatile compound and at least a second compound having a low molecular weight and able to swell and/or soften the polymeric material forming said face, c/ letting at least said volatile compound to evaporate from said face of said first substrate, and d/ contacting the so-treated face of first substrate with a third material.

According to another embodiment, the method of the invention may be useful for creating microstructures in and/or on a substrate.

Therefore, according to one of its aspects, the invention relates to a method for creating microstructures in and/or on a substrate comprising at least the above-recited steps a, b, d, and optionally step c/, wherein said third material is a template bearing the negative of said microstructures, and wherein said first polymeric substrate is pressed against said template in conditions sufficient to transfer said microstructures into said first polymeric substrate.

This corresponds to a family of processes known as "embossing", molding, casting or "compression molding", and conditions suitable for such processes, as well as protocols to optimize said conditions, are known from those skilled in the art. For the sake of terseness, in the following the different processed mentioned at the beginning of this paragraph are called under the general name "embossing".

According to another embodiment, the method of invention may be useful for bonding two substrates. Then, the third material considered in step d/ may be a second substrate.

Thus, according to this aspect, the invention provides a method for bonding at least one part of a face of a first polymeric substrate to at least one part of a face of a second substrate comprising at least the following steps of:

a/ providing a first polymeric substrate and a second substrate, b/ contacting at least one part of a face of said first substrate with some liquid solvent system, said liquid solvent system containing at least a first volatile compound and at least a second compound having a low molecular weight and able to swell and/or soften the polymeric material forming said face, c/ letting at least said volatile compound to evaporate from said face of said first substrate, and d/ contacting said so-treated part of the face of said first substrate with at least one part of a face of said second substrate, in conditions suitable to obtain their bonding.

Preferably, said second substrate may be a sheetlike substrate.

Preferably, either said first substrate or said second substrate or both bear on their surfaces to be bonded microstructures. Generally, said microstructures are located on the second, untreated substrate, but in some applications the presence of microstructures on said first substrate may be useful.

In another specific embodiment, the third material or second substrate, involved in step d/, may be a molecular compound, a family of molecular compounds, or colloidal particle(s), and the treatment of the first substrate provided by said invention has the advantage of facilitating the bonding between said substrate and said third material.

In this embodiment, the liquid solvent system involved in step b/ may advantageously comprise the third material or second substrate to be entrapped in and/or on a face of the first substrate.

According to one embodiment, said third material or second substrate may be biomolecules useful for conferring to the surface of said first substrate specific properties like catalytic and/or biological properties.

Thus, this third material or second substrate may be polymers or biomolecules able to facilitate the bonding of enzymes for the preparation of microreactors, the bonding of oligonucleotides, nucleic acids or nucleic acid analogs for performing on said substrate hybridization experiments, or the bonding of proteins, peptides or antigens for specific biomolecular recognition.

According to another embodiment, said third material or second substrate may be a photosensitizer.

According to another embodiment, said third material or second substrate may be a thermosensitizer.

The invention is thus useful for the development of miniaturized hybridization arrays, protein arrays. It is also advantageous for the development of ELISA, ELOSA tests.

Therefore, according to one of its aspects the instant invention relates to miniaturized hybridization arrays obtained from a polymeric substrate treated according to the method of the invention.

According to another of its aspects, the instant invention relates to miniaturized protein arrays obtained from a polymeric substrate treated according to the method of the invention.

The method according to the instant invention may also be useful for fabricating a microsystem, in particular a flexible microsystem comprising at least one embedded microchannels network, wherein said network involves at least one microchannel with a length larger than 10 cm, preferably larger than 18 cm, and yet more preferably larger than 25 cm, and does not involve in-plane turns with a radius of gyration smaller than $1/10^{th}$ of the microchannel length.

In particular said microsystem is obtained from a polymeric substrate treated according to the method of the present invention.

Preferably said microchannel does not involve in-plane turns with a radius of gyration smaller than 1/5, and preferably smaller than 1/2 of the microchannel length.

In a specific embodiment, said microchannel may have a depth smaller than 60 µm.

In a specific embodiment, said microchannel may have a length of at least 8 cm, preferably at least 10 cm, preferably at least 15 cm, and even more preferably more than 20 cm.

In another specific embodiment, said microsystem may be curved on at least a part of the length of the microchannel.

In another of its aspects, the invention provides a microfluidic device comprising a flexible microsystem as disclosed previously, i.e. comprising at least one microfabricated microchannels network or one microfabricated microchannels array, and at least two functional elements wherein said functional elements are independently aligned with regards to two different parts of said microchannel network, and wherein said parts are movable with regards to each other without altering the integrity of said microchannels network or microchannels array.

Preferably, the two functional elements comprise a detector and a fluidic connection, or a detector and a fluidic sampler.

According to an embodiment, a flexible microsystem of a microfluidic device in accordance with the invention may be obtained from a polymeric substrate treated according to a method of the invention.

According to another embodiment, the present invention relates to a template for embossing comprising a supporting flexible layer bearing on at least one of its faces a microstructure made of polymeric non-elastomer substrate and able to transfer the negative shape of said microstructure onto a polymeric substrate treated according to the method of the invention.

A template according to the invention may comprise a microstructure made of a photoresist or an UV glue, a thermoplastic polymer, a thermoset or a resin.

A template according to the invention may comprise a supporting layer and a microstructure which are integral.

According to one embodiment, a template according to the invention may comprise a supporting layer and a microstructure which are made of different materials.

According to another embodiment of the invention, a template according to the invention may be affixed onto a roll used in roll embossing, or onto a band used in band embossing.

BRIEF DESCRIPTION OF THE FIGURES

FIG. 1A is a template, prepared according to example 2. FIG. 1B is its replication into a cyclic olefin copolymer (COC) film by prior art roll embossing according to comparative example 3. FIG. 1C represents a COC film by solvent-assisted embossing according to example 5.

DETAILED DESCRIPTION OF THE INVENTION

Figure 1:
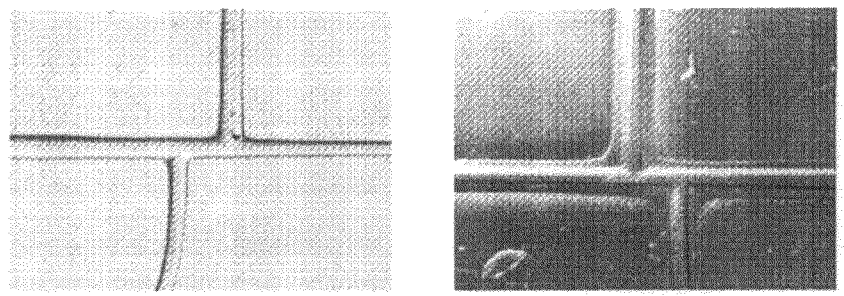
FIG. 1 represents a comparison of prior art embossing of microstructures and embossing according to the invention.
Figure 1:
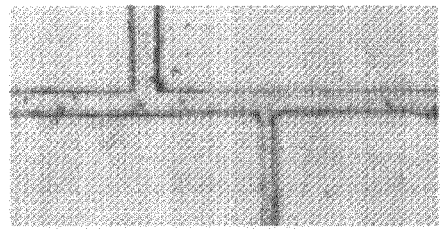

The term "microsystem" as used herein, refers to a device involving deliberate and functional microstructures, prepared by a process involving in one of its step microfabrication of self-assembly.

The term "microstructure" as used herein refers to any specific shape presented by the surface of a substrate, with at least one dimension smaller than 500 µm. This term is to be interpreted in a broad sense. Thus, it is not intended to be restricted to elongated configurations where the transverse or longitudinal dimension greatly exceeds the diameter or cross-sectional dimension, or to periodic patterns. In contrast with a microchannel, a microstructure does not need to be an enclosed volume, and it can lay on an open surface.

The term "microfluidic" as used herein to further qualify a microsystem is to be understood, without any restriction thereto, to refer to structures or devices through which fluid(s) are capable of being passed or directed, wherein one or more of the dimension(s) is/are less than 500 microns. In some embodiments, microfluidic systems may involve microchannels.

The term "microchannel" as used herein is to be interpreted in a broad sense. Thus, it is not intended to be restricted to elongated configurations where the transverse or longitudinal dimension greatly exceeds the diameter or cross-sectional dimension. Rather, such terms are meant to comprise cavities, tunnels or three dimensional structures of any desired shape or configuration. Such a cavity may, for example, comprise a flow-through cell where fluid is to be continually passed or, alternatively, a chamber for holding a specified, discrete amount of fluid for a specified amount of time.

The term "microchannels array" designates an ensemble of at least two, non connected, microchannels, microfabricated in the same substrate. A microchannels array may involve microchannels that are in addition involved in microchannels networks, thus leading to an array of microchannel networks.

As used herein, the term "microchannel network" refers to one or more microscale channels that are disposed between two substrates, and are in fluid communication, or can be put in fluid communication with each other thanks to a microvalve integrated in the substrate.

Microchannels according to the invention can be straight or present turns. Since the microsystems in which microchannels are embedded can be themselves flexible in some embodiment, when a microchannel does not follow a straight line, it is necessary to precise its direction of curvature. In this document, we shall by convention call a "bend" a curvature of the axis of a microchannel with a radius of curvature perpendicular to the plane locally tangent to the substrate at the point where said radius of curvature intersects the microchannel axis. In contrast, we call a "turn" a curvature with a radius located in the plane tangent to the system, or, in other words, a curvature in the substrate's plane. A sharp angle is also considered as a bend or a turn, with zero radius of curvature.

As used herein, the term "sheetlike substrate" is used to refer to solid substrates having first and second opposing and substantially parallel surfaces. Typical sheetlike substrates within the invention can be polymeric plates or polymeric films. Substrates within the invention can bear on one or both of their faces microstructures or microchannels. They are said "sheetlike", if one can define a scale, larger than the smallest dimension of the microchannels or microstructures, at which the two faces of said substrate are locally parallel. For instance, substrates that can be bent with a radius of gyration of 1 mm and up, and bearing on at least one of their surfaces microchannels or microstructures with a thickness of 10 to 100 nm are considered as sheetlike according to the invention.

The term "bonding" is used to designate the attachment of a wanted material to at least one first substrate. Said material can be of various kinds, depending on the application. In particular, it can represent a second substrate, with characteristics comparable to those of said first substrate or different. Said material can also be any surface treatment material such as hydrophilic or hydrophobic polymers, biomolecules, metals, electrodes, catalysts, ligands, micro or nanoparticles.

The term "solvent" is used to designate a compound that is liquid at room temperature, and able to dissolve other compounds. Typical solvents usable within the invention are water, a vast variety of organic solvents, polar or not polar, or ionic liquids. Examples of organic solvents can be found e.g. in the Handbook of Chemistry of Physics $79^{th}$ edition, edited by David R. Lide, CRC Press, pages 15.14 to 15.18.

A solvent or compound is called "volatile", if it has a finite vapor tension, so that a thin layer of said solvent or compound, spread on a solid surface, can disappear from such surface by a spontaneous phase transformation from liquid to gaseous.

With regards to a given, non-crosslinked substrate, a solvent is called a "good solvent", if it is capable of dissolving said substrate material in all proportion, or at least in a large proportion, typically more than 20% w/w.

With regards to a crosslinked substrate, a solvent is called a "good solvent", if it is able to swell said substrate to a large extent, typically larger than 20% w/w.

In contrast, a solvent which is not a good solvent for a material is called a poor solvent of such material. Solvents according to the invention can also consist in a mixture of different types of molecules, provided said mixture have the properties of a solvent as known by those skilled in the art and briefly recalled above.

A compound is called a "plasticizer" of a substrate material if it is able to be durably incorporated into said substrate material, and decrease the glass transition temperature of this material, without leading to a chemical alteration of the molecules constituting said material.

In this document, a "low molecular weight compound" represents a type of molecule, or a family of molecules, with an average molecular weight smaller than 5000 Daltons, preferably smaller than 1000 Daltons.

By "liquid solvent system" within the invention we intend to designate a composition able to transfer in a controlled manner onto a substrate a compound which is a solvent or a plasticizer of said substrate or a compound which is able to swell or to plasticize said substrate.

This liquid solvent system thus comprises in addition to said compound a "transfer agent".

In one family of preferred embodiments, said transfer agent may be a volatile compound or solvent that is not a good solvent of said polymeric substrate.

In another family of preferred embodiments, said transfer agent may be a solid compound able to transfer a material onto a surface.

In the field of microfluidics, such solid compounds are generally called "microcontact transfer stamp", "microcontact transfer compound", or "microcontact transfer element", or in a more familiar way "inkpad". In the present text, the different designations recited above will be used indifferently, with the acceptance that they designate any type of solid, deformable or non-deformable element able to transfer a material onto a surface of a substrate material by applying onto said surface or in close proximity of said surface such element bearing such material. The term "inkpad" will be used in most cases for the sake of terseness.

According to one embodiment "inkpad" or equivalently "microcontact transfer compound" refers to a matrix that is capable of absorbing or adsorbing a compound or a composition or capable of being wetted by said compound or composition and capable of releasing said compound or composition onto a surface of a substrate material, when said substrate material is placed in the proximity or in contact with the surface of the inkpad.

An inkpad or a microcontact transfer compound suitable for the invention may exhibit a combination of flat surface and/or curved surface.

An inkpad or a microcontact transfer compound may be rigid or flexible to provide good conformation properties when a contact has to be established with the surface of a substrate material.

The contact between an inkpad or a microcontact transfer compound and a part of a face of a polymeric substrate material to be treated may be established simultaneously over the inkpad surface or progressively using the inkpad as a roll that is moved over the substrate material.

Depending on applications, an inkpad or a microcontact transfer compound may be made of various types of solid materials, and particularly of porous and elastomeric materials. Typical and non limitative examples of materials usable for making inkpads are natural or artificial rubber, silicone rubber, thermoplastic polymer films, epoxy or polyester resins, or other types of thermoset resins.

The terms "template", "master" or "embossing tool" are used indifferently to designate a solid object bearing the negative of microstructures that one wants to create on a surface of substrate material, by pressing said template or tool onto said substrate. In contrast with the inkpad or microcontact transfer compound, the template or embossing tool must deform the substrate in order to perform its function.

SUBSTRATE

As noted above, the invention generally provides improved methods for fabricating microfluidic devices.

Generally, these improved methods allow for the rapid fabrication of polymeric devices that incorporate microscale fluidic structures, whereby the fabrication process does not substantially distort or deform such structures.

In a first aspect, the methods of the present invention generally address the problems typically associated with the fabrication of microfluidic devices from polymeric substrates.

In preferred aspects, the methods described herein are directed to solvent bonding methods of fabricating microfluidic devices.

A variety of materials may be employed to fabricate the polymeric substrates considered according to the invention.

Typically, because the devices are microfabricated, substrate materials will be selected based upon their compatibility with known microfabrication techniques, e.g., photolithography, wet or dry chemical etching, photoablation or plasma ablation, air, water or powder abrasion techniques, injection molding, embossing, thermoforming and other techniques. The substrate materials are also generally selected for their compatibility with the full range of conditions to which the microfluidic devices may be exposed, including extremes of pH, temperature, salt concentration, and application of electric fields. Substrates are also generally selected for their electrokinetic properties, e.g., surface potential, thermal and optical properties, e.g., transparency etc.

The terms polymeric or polymer are used to designate organic or inorganic macromolecular compounds.

One category of such materials particularly useful within the invention is the family of thermoplastic polymers. Classical thermoplastics are polystyrene (PS), polycarbonate (PC), acrylate polymers and as examples polymethylmethacrylate (PMMA), polyesters and as an example Polyethylene Terephtalate (PET), cyclic olefin copolymers (COC), polyimide (PI) polypersulfone (PPS) and polyether ketones (PEK, PEKK, PEEK).

Another category of polymers useful within the invention is the family of elastomers. Illustrative examples of elastomers are silicones such as Polydimethysiloxane (PDMS), natural and artificial rubbers and more generally the family of poly-dienes (polybutadiene, polyisoprene, and the like), fluorinated polysiloxanes. These elastomers may be used in a chemically crosslinked form, or in a non-crosslinked form.

A third category of materials used as substrate within the invention are chemically crosslinked resins, such as epoxides, crosslinked polyesters or polyurethanes, etc . . . .

Numerous other thermoplastic, elastomeric or resinous polymers may be processed according to the invention depending on the specific applications and wanted properties, and are known by those skilled in the art. Some further examples are given e.g. in Polymer Handbook, $3^{rd}$ edition, edited by J. Brandrup and E. H. Immergut, Wiley Interscience.

In a particularly preferred aspect, a first polymeric substrate material used in accordance with the invention may be selected among cyclic olefin copolymers, polymers containing norbornene moieties, polymethylmethacrylate, acrylic polymers or copolymers, polystyrene, substituted polystyrene, polycarbonate, polyimide, silicone elastomers, fluoropolymers, polyolefins, epoxides, polyurethanes, polyesters, and polyethylene terephtalate, polypersulfone and polyether ketones.

Cyclic olefin polymers and copolymers may be particularly convenient for the invention.

In one aspect of the invention said first polymeric substrate may be rigid.

In another aspect of the invention, said first polymeric substrate may be flexible.

Preferably, the substrate made from these polymeric materials may be a sheetlike substrate.

The thickness of sheetlike substrates according to the invention may also vary widely. Typically, they may vary from 20 µm to 10 mm. Generally, however, this thickness is larger than the thickness of the microstructures or microchannels present on the substrate surface.

Liquid Solvent System

As stated previously, the instant invention derives from the observations by the inventor that the choice of a specific solvent system with respect to the polymeric material forming the substrate allows to obtain improved surface treatment of face(s) of said substrate.

More particularly, a liquid solvent system of the invention requires the presence of at least two specific compounds, a first compound or transfer agent not able to penetrate into the polymeric substrate material the face of which being treated, and a second compound which may be a good solvent of said polymeric substrate material.

In an embodiment said first compound or transfer agent may be a volatile compound that may be non-solvent or a poor solvent of the polymeric substrate material the face of which being treated.

In another embodiment, said first compound or transfer agent may be an inkpad or a microcontact transfer compound.

Therefore, according to one of its aspect, the invention provides a method for treating the surface of a polymeric substrate, in particular a microfluidic polymeric substrate, comprising at least the steps of:

a/ providing a first polymeric substrate, b/ contacting at least one part of a face of said first substrate with some liquid solvent system, said liquid solvent system comprising at least a first microcontact transfer solid compound and at least a second compound having a low molecular weight and able to swell and/or soften the polymeric material forming said face, and said first microcontact transfer solid compound being able to be swollen by said second compound or to adsorb said second compound, or to be wetted by said second compound, and d/ contacting the so-treated face of first substrate with a third material.

According to one embodiment, the above-method of the invention may comprise an additional step c/ consisting in letting at least said volatile compound to evaporate from the face of said first substrate, said step being performed after step b/, concomitantly or not with step d/.

According to another aspect, the invention provides a method for bonding at least one part of a face of a first polymeric substrate to at least one part of a face of a second substrate comprising at least the following steps of:

a/ providing a first polymeric substrate and a second substrate, b/ contacting at least one part of a face of said first polymeric substrate with some liquid solvent system, said liquid solvent system comprising at least a first microcontact transfer compound and at least a second compound having a low molecular weight and able to swell and/or soften the polymeric material forming said face, and said first microcontact transfer compound being able to be swollen by said second compound or to adsorb said second compound or to be wetted by said second compound, and d/ contacting said so-treated part of the face of said first substrate with at least one part of a face of said second substrate in conditions suitable to obtain their bonding. Preferably, said second substrate may be a sheet-like substrate.

As previously indicated, either said first substrate or said second substrate or both bear on their surfaces to be bonded microstructures. Generally, said microstructures are located on the second, untreated substrate, but in some applications the presence of microstructures on said first substrate may be useful.

The second compound may be a good solvent of the same given material.

Furthermore, said second compound has to be of low molecular weight.

The selection of both obligatory compounds may be performed with respect to their respective reactivity towards the polymeric material forming the face of the substrate to be treated.

As stated previously, a compound is called a "good solvent", if it is capable of dissolving said substrate material in all proportion, or at least in a large proportion, typically more than 20% w/w.

With regards to a crosslinked substrate, a solvent is called a "good solvent", if it is able to swell said substrate to a large extent, typically larger than 20% w/w.

This reactivity of good solvent may also be acknowledged to a compound that could be also called "plasticizer" towards said polymeric material. In other words, its material contact with the substrate decreases the glass transition temperature of the polymeric material without leading to a chemical alteration of the molecule constituting said material.

A compound is called a "a non-solvent or a poor solvent" of a given substrate material, if it is not capable of dissolving said substrate material in a proportion greater than 20% w/w.

The selection of the most convenient liquid solvent system may be also performed by the following process.

The first step of it consists in selecting a first volatile compound or solvent, which is a poor solvent of said polymeric material.

The second step consists in selecting a second, low molecular weight compound that can be incorporated into said polymeric material, and miscible with said first compound. In general, the selection of said first and second compounds can be made using handbooks listing the solvents of different polymers, such as the "Polymer Handbook".

However, to extend the scope of available compounds, it is also possible to determine these compounds by a trial experimental process, i.e. by contacting said polymeric material with said compound: if the compound does not dissolve or swell significantly said polymer, it can be used as said "poor solvent" and if the compound does dissolve or swell significantly said polymer it can be used as said second compound.

As a third step, mixtures of these two first compound and second compound in different proportions are prepared and tested with respect to the considered polymeric material for example by following the process disclosed in example 9 or 11. In general, one will preferably explore the composition range in which the first compound is more abundant that the second compound.

This protocol can be reproduced with several liquid solvent systems until the optimal compromise between channel integrity and bonding strength is obtained.

Preferably, the proportion of said first volatile compound or solvent in said liquid solvent system may be higher than 50%.

Preferably, the proportion of said second compound in said liquid solvent system is lower than 50%, more preferably comprised between 1% and 45%, in particular between 1% and 25%, and more preferably comprised between 2% and 15%.

When said first compound is an inkpad or a microcontact transfer compound, the proportion of said second compound is limited by the absorption or swelling properties of the inkpad.

In a first preferred embodiment, said first compound or solvent is volatile.

In a yet preferred embodiment, it is more volatile than said second compound.

Preferably, said first volatile compound and said second compound are miscible.

For example, the following pairs of solvents may be used in association with a few typical thermoplastic polymers: a mixture of toluene/acetone for a first substrate based on polydimethylsiloxane (PDMS), a mixture of chloroforme/ethanol for a first substrate based on polymethylmethacrylate (PMMA), a mixture of chloroforme/methanol for a first substrate based on polycarbonate; a mixture of phenol/ethanol for a first substrate based on Polyethylene Terephtalate (PET), a mixture of dichloromethane/ethyl acetate or of hexadecane/isopropanol for a first substrate based on cyclic olefin copolymers (COC) and a mixture of ethyl acetate/acetone for a first substrate based on Polystyrene.

As stated previously, at least one part of one face of the polymeric substrate to be treated is contacted with the liquid solvent system.

According to a specific embodiment, when said liquid solvent system comprises said first volatile compound and said second compound it may be deposited as a film on at least a part or on the totality of the face to be treated.

It is let in this area until all the evaporation of the volatile compound is achieved.

When the volatile compound is evaporated, the speed of such evaporation will be advantageously adapted to the specific conditions of the process in which the invention is applied. A too short evaporation time may lead to poor reproducibility, and to a non-uniform treatment of the substrate's surface. Alternately, a too long evaporation time will unduly increase the overall time of the process. Those skilled in the art know methods to adapt the evaporation time of a solvent to a given objective.

For instance, the evaporation time can be reduced by increasing the temperature of the substrate, or by reducing the thickness of the solvent film deposited onto the substrate. Alternately, the evaporation time can be increased by confining the atmosphere above the treated substrate, in order to achieve a non-zero pressure vapor of said solvent in said confined volume or by increasing the thickness of the solvent film. The evaporation time can also be increased by choosing a solvent with a high boiling temperature. As exemplary guidelines, for a continuous high throughput treatment, it will be desirable to adapt the solvent and operating conditions so that the quantity of liquid solvent system deposited onto the substrate for its treatment evaporates in a time comprised between one second and one minute. The thickness of said film should also be adapted to the smallest scale of the microstructures present on the substrates involved in the process.

Typically, the thickness of the film is comprised between 0.1 times the smallest size of said microstructures, and 100 times said smallest scale. For microstructures with a smallest scale comprised between 10 µm and 100 µm, the thickness of said film will advantageously be comprised between 50 µm and 1 mm.

In addition to said first volatile compound and said second liquid compound, the liquid solvent system according to the invention may also contain other additives. As an examplary and non-limitative list, it may for instance be interesting to add into said liquid solvent system compatibilizing agents, agents aimed at improving wetting of said composition onto said substrate, agents aimed at modifying its viscosity or its evaporation rate, or agents aimed at improving the stability of said liquid solvent system, such as antioxydants, stabilization agents and the like.

Preferably, however, liquid solvent systems according to the invention are formulated in order not to leave on the substrate after their evaporation, a solid or fluid layer with properties different from those of the substrate. In contrary, one advantage of the system according to the invention is that compounds in said system do not remain on the surface of said substrate. This way, the surface chemical properties of said substrate are not significantly altered. Preferably, then, liquid solvent binding systems according to the invention do not contain significant amounts of polymers, polymerizable monomers or polymer precursors.

According to another specific embodiment, the first compound may be an inkpad or a microcontact transfer compound and said inkpad may be immersed in said second compound prior to its contact with the substrate to be treated.

After immersion excess of second compound is removed from the said inkpad surface, by one of the methods known by those skilled in the art, for instance using a pressurized gas flow or using the so-called doctor blade, consisting in sweeping a blade on top of the surface to achieve a regular layer, or using a spin-coater or using a complementary blank second inkpad placed into contact with said inkpad.

APPLICATIONS OF THE METHOD ACCORDING TO THE INVENTION

As stated, the method of the invention is useful to create onto substrates treated by this way, microstructures by pressing said substrate against a "master" or "template" bearing the negative image of said microstructures.

Thus, in one of its embodiments, the invention provides a method for creating microstructures on a polymeric substrate, involving the four steps a, b, c, and d recited above, wherein said third material is a template or a master bearing the negative of microstructures, and wherein said polymeric substrate is pressed against said template or contacted with said template in conditions sufficient to transfer said microstructures into said polymeric substrate.

This process is known as "embossing", and conditions suitable for embossing as well as protocols to optimize said conditions, are known from those skilled in the art. In a first embodiment, said embossing is achieved in a non-continuous way, in a press, under a temperature.

The advantage of the invention with regards to this mode of embossing is that it facilitates the deformation of the surface of the face of the substrate in contact with the master or template at a lower temperature, at which the other side of the substrate is not yet deformable, or less deformable. This allows performing embossing at a lower temperature, to shorten the embossing time, and also to reduce the constraints left in the substrate after embossing. These constraints are known to lead to potential problems in further use, such a stress cracking.

The invention is particularly advantageous in combination to continuous embossing processes known as roll embossing or band embossing.

In this process, the substrate to be embossed, provided as a film, is kept in tension and pressed onto a hot roll bearing the negative microstructures to be transferred to said substrate. Roll embossing of microstructures is described e.g. in U.S. Pat. No. 6,375,871 to Bentsen. The contact between the substrate and the embossing tool or template is limited in time, so that the deformation of the substrate must be fast enough, and said substrate must be brought to a relatively fluid state. But then, the substrate would not be able to withstand the tension necessary for its continuous transport. U.S. Pat. No. 6,375,871 proposes a solution to this, called extrusion embossing, in which the substrate is delivered in the liquid state between the master and a supporting film, that remains unmelted at the temperature of embossing. This method, however, leads to a composite film, which may not be suitable for many applications. First, it limits the number of materials usable, due to problems of adhesion and compatibility between the substrate and the supporting film. Also, because of differences in dilatation coefficients, composite films prepared this way will tend to deform upon temperature changes. US patent application 2005/0029708 to Coyle proposes a solution to this problem, in which the material for making the substrate is provided in a melt state between one roll at a temperature above the material's glass transition temperature, bearing the microstructures to be replicated, and a roll at a temperature lower than the material's glass transition temperature, inducing the formation of a film during the embossing process. The tuning of this process is delicate, however, it is not compatible with all materials, and in practice it often also requires a supporting second film. Finally the strong temperature gradient across the substrate induces strong residual stresses, that can lead to stress cracking and other defects in the roll. Finally, the situation of continuous embossing can be improved by band embossing, which allows a longer time of contact between the substrate and the master or template, but the above problems remain.

With the process according to the invention, in contrast, the plasticity of the material can be tuned to vary continuously across the substrate, allowing for a plastically deformable upper layer that will replicate the microstructures on the master or the template, whereas the bulk of the substrate remains non-deformable and keeps its shape.

Thus, in a preferred embodiment, the invention is combined with a further step involving continuous transfer or embossing, and particularly roll embossing or band embossing, of a substrate.

According to a preferred embodiment, the transfer or embossing is performed at a temperature below the glass transition of said first polymeric substrate.

According to another preferred embodiment, suitable when the contact time between the polymeric substrate and the master or template is short, the transfer or embossing is performed at a temperature above the glass transition of the first substrate.

In a particular embodiment, suitable when the contact time between the substrate and the template is long, said temperature is typically no more than 30° above said glass transition temperature.

The invention is useful for hot embossing, and particularly roll embossing or band embossing, because it makes the surface of the substrate to be patterned "softer", without making the bulk of the substrate weaker. Thus, it allows performing embossing with new families of masters, which were not mechanically resistant enough for hot embossing.

It is thus a further aspect of the invention to provide a new family of templates for embossing.

More specifically, said templates comprise a supporting flexible layer, bearing on at least one of its faces at least one microstructure made of a polymeric substrate, treated according to a method of the invention, or preferably of non elastomer polymeric material. In one embodiment, said microstructures are made of a photoresist or an UV glue, a thermoplastic polymer or of a resin.

Examples of thermoplastic polymers used for these microstructures are polyethythylene terephtalate (PET), Polyimide (PI), fluoropolymers. Examples of resins are epoxy or polyester. Examples of photoresists usable for this embodiment are Ordyl or SU8.

Generally, these thermoplastic polymers may have a melting temperature or a glass transition temperature significantly higher than the glass transition of the substrate to be embossed.

A useful strategy in accordance with the invention is to use thermoset resins, or photoresists. As for the flexible layer, it may be made of various, non brittle material. The important point is that the thickness of the layer be adapted so that it can be bent without breaking, on a radius of gyration at least as small as the radius of gyration of the roll used for embossing. Besides this restriction, the supporting flexible layer can be made of metal, for instance aluminium, titanium, steel, stainless steel, copper, nickel, or metal blends. It can also be made of polymers, for instance polyimide, or even fabric, paper or glass (in the latter case the glass must be thin enough to be bendable).

In one embodiment, the supporting layer and the microstructures may be integral, i.e. made of the same material.

In another embodiment, the supporting layer and the microstructures may be made of different materials.

In some other embodiments, the supporting layer itself may be composite, i.e. it can involve a first layer chosen for its mechanical and/or thermal properties, and a second layer chosen to improve the adhesion of the material used for making the microstructures.

In a preferred embodiment, said templates are flexible substrates.

In one embodiment said templates may be affixed onto a roll used in roll embossing, or onto a band used in band embossing.

This allows to have a non planar embossing tool or template, thus proving better control of embossing pressure and time, without going into the cost of preparing a hard roll with microstructures, as in prior art.

In another of its aspects, the method of the invention is also useful for bonding two substrates.

Then, the third material considered in step d/ is a second substrate.

Thus, according to this aspect, the invention provides a method for bonding at least a part of a face of a first polymeric substrate to at least a part of a face of a second substrate comprising the following steps:

a/ providing a first substrate and a second substrate, b/ contacting at least a part of one face of said first substrate with some liquid solvent system, said liquid solvent system containing at least a second first volatile compound and at least a low molecular weight compound that is able to swell and/or soften the polymeric material forming said face of the first substrate, c/ letting at least some of said volatile compound to evaporate from said part of the face of said first substrate, and d/ contacting the so-treated part of said face of said first substrate with at least one part of a face of said second substrate, in conditions suitable to obtain their bonding.

Preferably, said second substrate is a sheetlike substrate.

In one aspect of the invention, at least one of said first and said second substrates may be substantially rigid.

In another aspect of the invention, at least one of said first and said second substrates may be flexible.

Said second application of the invention, however, is particularly advantageous in the case where the two said substrates are flexible.

Preferably, either said first substrate or said second substrate or both, bear on their surfaces to be bonded, microstructures, said microstructures may define integrated microchannels network or an integrated reservoir.

Generally, said microstructures are located on the second, untreated substrate, but in some applications the presence of microstructures on said first substrate may be useful. In all cases when substrates involve microstructures, preferably the optimization of bonding conditions also involves the requirement of achieving the best conservation of said microstructures after the bonding process.

Conditions for obtaining such bonding and for avoiding microstructures deformation can be defined and optimized by those skilled in the art, knowing the physical properties of said substrates. This optimization involves in particular the choice of the pressure applied between the substrates, the temperature, and time during which said pressure and temperature are applied to both substrates.

According to another embodiment of the invention other types of third materials as those previously detailed may be used within the invention, in order to impart specific properties to the surface of said substrate.

These types include, as a non-exhaustive list, polymers, monomers, biological macromolecules such as nucleic acids, nucleic acids analogs, proteins, peptides, polysaccharides, proteoglycans, organic, inorganic or composite organic/inorganic microparticles or nanoparticles.

Thus, according to this embodiment, the liquid solvent system involved in step b/ may advantageously comprise a third low-molecular weight compound, in particular as disclosed here-above suitable for example to improve the chemical reactivity between said substrate and said material.

In contrast with prior art, in which such molecular weight compounds were added as a solution in a simple solvent, the process of the invention allows a penetration of said third low-molecular weight compound inside a layer of finite thickness closed to the surface of the substrate, and to precisely tune the depth of penetration and the concentration. It thus allows stronger and more uniform bonding of said third material.

Functionalization of substrates according to this third specific embodiment can be used for imparting various properties to the treated substrate.

The use of polymers, monomers or particles, for instance, can also be used for changing the charge of the surface, the wetting properties of said surfaces, or its resistance to the adsorption of species. In a preferred embodiment, it can be used to reduce the adsorption of nucleic acids or proteins.

The use of polymers or particles, and in particular inorganic particles, can be also used to impart to the surface of said substrate catalytic properties.

Furthermore, the use of biomolecules can be used to impart to the surface of the substrate specific biological properties.

According to an embodiment, said third material may also be a photosensitizer or a thermosensitizer composition.

Numerous photosensitizers are known in the art, such as, as an exemplary and non-exhaustive list, benzophenone, AIBN (2,2'-azobisisobutyronitrile), ABCN (1,1'-Azobis(cyclohexanecarbonitrile)). It may be also redox polymerisation initiator like cysteamine ($C_2H_7NS$)/potassium persulfate $K_2S_2O_8$ and ammonium persoxydisulfate $(NH_4)_2S_2O_8$/sodium metabisulfite.$Na_2S_2O_5$.

The choice of the optimal initiator and of the optimal concentration of initiator can be made according to different parameters such as the solubility of said initiator in the different solvents suitable for the treatment of a given substrate, to the temperature used for interaction with said third substrate, and to the specific sensitivity of said substrate to said initiator. Usually, the weight fraction of initiator is comprised between 0.1% and 5%, preferably around 1%.

A particular advantage of the invention, that exerts its benefits with regards to the previous embodiments above, is that it allows both the fabrication of microstructures and the bonding of various materials, on polymeric substrates that can be mass-produced at low cost. It is also advantageous, in that it allows bonding and functionalization of polymeric materials that were difficult to functionalize or bond with prior art, such as silicone elastomers or polyolefins, in particular polyolefins of the COC type.

The method according to the instant invention is also useful for fabricating a microsystem, in particular a flexible microsystem, and more particularly a flexible micro fluidic microsystem like laboratory chip for example, comprising at least one embedded microchannels network, wherein said network involves at least one microchannel with a length larger than 10 cm, preferably larger than 18 cm, and yet more preferably larger than 25 cm, and does not involve in-plane turns with a radius of gyration smaller than $1/10^{th}$ of the microchannel length.

In particular, said microsystem is obtained from one polymeric substrate treated according to the method of the present invention In a specific embodiment, said microchannel has a depth smaller than 60 µm.

In a specific embodiment, said microchannel has a length of at least 8 cm, preferable at least 10 cm, preferably at least 15 cm, and even more preferably more than 20 cm.

In another specific embodiment, said microsystem is curved on at least part of the length of the microchannel.

In preferred aspects, such channel networks include at least two microscale channels, in particular at least one intersection between at least 3 microchannels and preferably, at least two intersecting microscale channels.

The intersection of channels can include channels which intersect and cross, e.g., at "four-way intersections, as well as a channel intersection wherein one channel intersects and terminates in another channel, e.g., at a "T" or "three-way" intersection. In many aspects, the individual channel networks will preferably include at least three intersecting channels, in some aspects, greater than four intersecting channels and often greater than five, six or even eight intersecting channels.

"Microchannels" and or microstructures formed in first substrates or microsystems of the invention may be filled or may contain internal structures comprising valves or equivalent components.

Microchannels, microchannel networks or microstructures may be filled with, decorated with, or may contain internal structures. They may contain functional elements such as, an exemplary and non-exhaustive list, pumps, valves, integrated detectors, electrodes, membranes, bioreactors, catalysts, recognition sites, or ligands.

Microstructures within the invention may also be made of materials with specific optical properties, for instance for the purpose of preparing miniaturised optical elements, optical sources, optical detectors, optical quantum wells, and son on.

With regards to said microstructures or microchannels they have a smallest dimension comprised between 10 nm and 500 µm.

The invention is particularly advantageous for small microstructures and nanostructures, i.e. structures with smallest dimensions comprised between 10 nm and 100 µm, and even more preferably smaller than 60 µm. Although it is not a restriction of the invention, which can be used in combination with microstructures with any aspect ratio, the invention is particular advantageous in combination with microstructures with an aspect ratio smaller than one (i.e. e.g. microchannels with a width or smallest dimension in the plane of the substrate larger than the smallest dimension of said microstructures in a direction perpendicular to the substrate's surface). However, the invention may also be used with success for preparing microstructures with a high aspect ratio, e.g. from 1 to 10.

In this document, a microstructure, microsystem or microchannel is called "integral" if it part of a macroscopic, self-standing macroscopic object entirely made of the same material. For instance, an "integral microchannel" is a microchannel in which all walls are made in the same bulk material. "Integral microstructures" are microstructures that are made of the same material as the substrate bearing them.

As a non limitative example, a microchannel made by the bonding of two sheets of the same thermoplastic polymer, one of which has been embossed to define a trench, is an integral microchannel.

In contrast, a microchannel prepared by bonding two sheets of the same thermoplastic polymer, with an intermediate stencil layer of another material, such as hot melt, thermosensitive adhesives, thermosets, pressure sensitive adhesives, photopolymerizable resin, or more conventional glue is not "integral". Microstructures such as posts or microwells, prepared by hot embossing, injection molding, etching, laser or plasma ablation, or abrasion, at the surface of a substrate, are integral to this substrate, but posts or microwells, prepared e.g. by photolytography of a resin deposited on a material, are not integral. As will become apparent in the following of this description, integral microstructures or microchannels present over non-integral ones several advantages for numerous applications.

Integral microstructures may be, in a second step, filled with a second generation of microstructures, such as microbeads, monolith, and the like. In that particular case, said microstructures will retain their integral character, which had been imparted to them irreversibly by the way they were prepared within the substrate that support them.

Microsystems according to the invention thus combine several advantages of microfluidic systems, such as high integration, easy and low cost microfabrication, small size channels, with several advantages of capillary arrays systems, such as long channels without sharp turns and independent positioning of different functional elements.

Another advantage of microsystems according to the invention, with regards to prior art, is that they allow the integration of long channels into a compact space, without compromising resolution. In previous microfluidic systems, long channels could be achieved in compact devices only by making the channels serpentine, introducing sharp turns detrimental to resolution. The loss of resolution could be minimized by making microchannels with a high aspect ration in the turns, but these microstructures with high aspect ratios are very difficult to fabricate, and they increase Joule heating in the turns, leading to another source of dispersion. In another element of prior art, sharp turns are avoided by preparing microchannels with a spiral geometry. This geometry, however, occupies a lot of space in the plane of the substrate, and does not allow convenient multiplexed detection in several spirals simultaneously. Thus, it is not suitable for microchannel array, high throughput devices.

Thanks to the invention, it is also possible for instance to prepare a microsystem comprising a series of many parallel and essentially linear long microchannels, allowing for a multiplexed detection scheme very comparable to that of prior art capillary arrays, and to roll said microsystem into a spiral in order to occupy a small space, thus combining the advantages of spiral microfluidic channels and high multiplexing ability. In addition, by preparing low aspect ratio microchannels, the bends of said microchannels are in the direction of the smallest dimension of the microchannel, thus having the advantage of high aspect ratio turns in prior art such as Ramsey (Anal. Chem. 2003, 75, 3758-3764) without the disadvantages of higher Joule heating and difficult fabrication.

It is thus also a further object of the invention to provide a microfluidic device comprising a flexible microsystem comprising at least one microfabricated microchannels network or one microfabricated microchannels array, and at least two functional elements wherein said functional elements are independently aligned with regards to two different parts of said microchannel network, and wherein said parts can be moved with regards to each other without altering the integrity of said microchannels network or microchannels array.

This specific disposition has several advantages, that were absent from the prior art long microchannels, prepared on rigid substrates. First, it allows embedding said microsystem into a device which is more compact than achievable with a rigid device containing the same microchannel network. Second, it allows to align independently different functional elements of said microsystem, such as injection ports and detection windows, with regard to functional elements of said device, without requiring a precise global alignment of the whole device.

Thanks to these properties, the invention can be used to develop high throughput assays, diagnosis devices, point-of-care devices, systems and protocols for the screening of pathogen agents in security or food industry, miniaturized production devices for high added value compounds in the chemistry, biochemistry, and biotechnology areas.

This list is by no mean intended to restrict the range of potential applications of the invention. In a general sense, all applications in the field of microsystems, microfluidics and lab-on-chips, that involve bonding or functionalization of polymeric materials, and/or the microfabrication of microstructures onto said polymeric materials, can benefit from the invention, and those skilled in the art will easily use the above description, and the examples described below, to develop specific embodiment of the invention for each of these applications.

EXAMPLES

Example 1

Preparation of a Rigid Template with Microstructures of Thicknesses from 20 to 50 µm for the Subsequent Preparation of Embossed Substrates Glass slides, with largest dimension ranging from 5 cm to 30 cm were cleaned in acid "piranha" solution (75% $H_2SO_4$ and 25% $H_2O_2$) for 30 minutes, rinsed in de-ionized water and air-dried. The slides were dehydrated in a convection oven at 150° C. Dry resist films (SY355), were bought from Elga Europe. The dry film laminate was cut to the size of the glass, the protective layer was peeled off and the resist was laminated on the clean glass substrate using a hot-roll office laminator (Catena 35 roll laminator, General Binding Corporation, USA) under UV-free conditions.

A mask with the microfluidic pattern was printed on a transparency film using a high-resolution printer. The PET layer was peeled off and the laminated resist was exposed through the mask using a UV lamp (refs 66057 and 68808 from Oriel Instruments). Following exposure, the substrate was baked on a hot-plate at 120° C. for 15 minutes to harden the exposed resist. The pattern was then developed in BMR Developer C3 with gentle shaking for 5 minutes and then rinsed in BMR Rinse F5 under daylight conditions. Following a rinse in polar solvent such as de-ionized water, or acetone or/and and isopropanol the template was dried by air jet and was ready to be used for embossing. Templates with microstructures of 20 and 30 µm, respectively, were prepared with the same process, except for replacing the dry film resists by references SY320, SY330, bought from Elga France.

Example 2

Preparation of a Large-Scale Flexible Template for the Preparation of Substrates According to the Invention by a Roll Lamination Process A set of processes following the same lines as presented in example 1, except for the differences quoted below:
200 µm thick PET film of format A4 was used as the support for the microstructures instead of glass slides.
The PET film was cleaned ultrasonically in acetone and isopropanol.
The resist was laminated on the cleaned PET film under the same conditions as the glass substrate and UV exposure of the microchannel pattern was carried out for 20 seconds.
Since PET has a glass transition temperature of 69° C., the exposed film was baked on a hot-plate at 95° C. for only 30 s to facilitate better sticking of resist on PET.
The pattern was developed as before using the BMR developer, rinsed using BMR rinse and dried by air jet. The resulting "master" is displayed in FIG. 1A.

Example 3

Improvement of the Preparation of Large Scale Flexible Templates

A set of processes for the preparation of flexible templates following the same approach presented in example 2 except for the following modifications has been performed. Instead of PET films, other supports for the microstructures can be used:
polymers films such as polyimide, of format A4 with thicknesses ranging from 50 µm up to 500 µm. Polyimide films were cut in the desired format (preferably A4 format), cleaned ultrasonically in acetone or isopropanol for 10 min. The films were then activated with air plasma for 60 s.
metal foils (e.g. aluminium, copper or stainless steel) may be used as support for the microstructures. Substrates were prepared according to the process described in the previous paragraph except an additional step consisting in a surface treatment with an acidic solution, such as orthophosphoric acid (37% in water) performed just before the plasma activation step.
Optionally, a layer of Dry-film resist, such as Ordyl SY355 can be laminated on the cited supports. For this specific dry film, Lamination is performed at 65° C. The full surface of the sample was exposed to UV light for 25 s. The samples were then baked at 120° C. for 15 min. This layer may be used to improve the adhesion of the microstructures on the supports.

Dry-film resist was laminated on the cited supports at 65° C. After exposing the Ordyl SY355 Dry-film resist to UV light through a mask for 25 s, the samples were baked at 120° C. for 15 min. The dry-film was developed in BMR developer C-3, rinsed in BMR rinse F-5, next washed in acetone and/or isopropanol and finally dried using pressurized nitrogen flow.

Comparative Example 4

Preparation of Large-Size Substrates in Thermoplastic Polymer by Roll Embossing Using the Templates Prepared in Examples 1 or 2

130 µm thick Topas 8007 cyclo-olefin copolymer (COCn Ticona GmbH) films (with a glass transition temperature of 85° C.) were cut in the size of the template, cleaned in isopropanol and dried in air prior to patterning. The lamination temperature was set to 130° C. and the lamination speed to 0.5 m/min. The gap between the rollers was set for "heavy-gauge" lamination to apply the maximum pressure to the COC film by the template during lamination.

The COC substrate and the template were pre-heated together on a hot-plate at 85° C. for 2 minutes to enable them to attain a uniform temperature before lamination. Afterwards they were passed together through the laminator rollers under the conditions described above. Once out of the laminator, the template and the COC film were allowed to cool down to room temperature, following which the patterned COC film peeled off easily from the template. The resulting substrate is displayed in FIG. 1B. The structure is visible, but it is widened as compared to the template, and presents a "foot", which is due to the limited deformability of the substrate during the limited contact time between the substrate and the master. More specifically, the widening is due to deformation of the substrate while the embossing process takes place. Possible improvements of the process may be obtained by increasing the contact time between the substrate and the master or the process temperature.

Example 5

Preparation of Large-Size Substrates in Thermoplastic Polymer by Roll Embossing Using the Templates Prepared in Example 3

130 μm thick Topas 8007 cyclo-olefin copolymer were cut in the size of the template (prepared in example 3), cleaned in isopropanol and dried in air prior to patterning. The lamination temperature was set to 180° C. and the lamination speed to 0.2 m/min. The gap between the rollers was set to apply the maximum pressure to the COC film by the template during lamination.

The COC substrate and the template were not pre-heated together contrary to example 4. Afterwards, they were passed together through the laminator rollers. Thanks to their flexibility, both template and substrate were wound onto the roller. As compared to example 4, this method is helpful to increase the time of contact and to provide a more uniform temperature between the roller, the template and the substrate. Once out of the laminator, the COC film was peeled off on a hot plate at 85° C.

Example 6

Improvement of the Preparation of Substrates in Thermoplastic Polymer, Using a Pretreatment with a Composition (Liquid Solvent System) According to the Invention The process follows this of example 4, except for the following differences.

Prior to the lamination process, a freshly-prepared 10% (v/v) mixture of hexadecane (a plasticizer of COC) in isopropanol (a poor solvent of COC) was poured on one side of the COC film using a pipette and the excess solvent was removed using a Kimwipe® after 1 min. The solvent was allowed to be absorbed by COC by leaving the film in air till there was no liquid on the surface. Then, the COC film was laminated following the same protocol as in example 4, taking care that the face of the film treated with the solvent mixture faces the template. The shape of the channel, presented in FIG. 1C, is improved with regards to those prepared according to example 4 (FIG. 1B).

This replication protocol can be applied to other thermoplastic polymers, by adapting the preheat and embossing temperatures to the glass transition and to the thickness of the substrate to be embossed.

Comparative Example 7

Vapor Solvent Bonding of Thermoplastic Polymer for the Preparation of Microchannels A 130 μm thick Topas 8007 COC, non-patterned film was provided. The film was exposed for 5 seconds to vapors of heptane, a good solvent of COC. The solvent treated face was rapidly placed on a second COC substrate, patterned with a master prepared according to example 1, using a 30 μm thick photoresist SY330, and passed through the laminator at a temperature between 65° C. and 85° C. to completely close the microchannels from the top. Next, 3 mm diameter access holes were punched through both the films using a card punch. In the second step, another COC film treated with the solvent was used to close the access holes from the bottom. Finally, commercially available microfluidic adapters were fixed on the punched holes using a UV-curable adhesive.

Cross-sectional cuts of the sealed channel were obtained using a cryocut instrument. The cut cross-section of the channel was imaged using a scanning electron microscope (SEM) (FIG. 2A). The cuts demonstrate a strong reduction of the channel thickness, due to a deformation of the treated COC into the recesses of the microstructured film. It also presents several "bridges between the two walls of the microchannel that partly block its lumen. FIG. 2B presents a transmission microscopy picture of a microchannel, prepared with a template with "posts" according to U.S. Pat. No. 6,322,753. The microchannel is filled with ink, and appears as dark. The space between the posts around the microchannel present numerous "bubbles", that show that the initial microstructure is poorly reproduced. On a practical side, it was often difficult to reproduce the protocol due to the very short duration (a few seconds) of the process. For some trials, liquid could be introduced into the channel, but unbonded parts of the device were also affected strongly by the solvent vapour. Also, the high evaporation rate of these solvents made the alignment of the two films difficult before the solvent had completely dried off. In many other trials, one obtained either blocked channels (due to a too strong plasticization of the cover), or oppositely absence of bonding, due to insufficient treatment as some places.

This confirms the difficulty of closing small size microchannels by solvent bonding.

Comparative Example 8

Solvent Bonding of Thermoplastic Polymer for the Preparation of Microchannels

The protocol followed that of example 7, except that instead of exposure to solvent vapor, heptane, a solvent of COC, was added on top of the film using a pipette and the excess solvent was removed using a Kimwipe®. The solvent was allowed to be absorbed by COC by leaving the film in air till there was no liquid on the surface.

After, the protocol followed as in example 7. In that case, the microchannels were totally blocked, and it was not possible to have a flow-through liquid transport. This further confirms the difficulty of closing microchannels, in particular thin and wide ones, with a solvent bonding protocol.

Example 9

Bonding of Thermoplastic Polymer for the Preparation of Microchannels by a Composition According to the Invention The protocol follows that described in example 8, except for the following modification:

Instead of heptane, a solvent of COC, a freshly-prepared mixture of hexadecane in isopropanol was added to the COC film using a pipette and the excess solvent was removed using a Kimwipe®. The solvent was allowed to be absorbed by COC by leaving the film in a hot-plate at 35° C. for 15 minutes.

Figure 2:
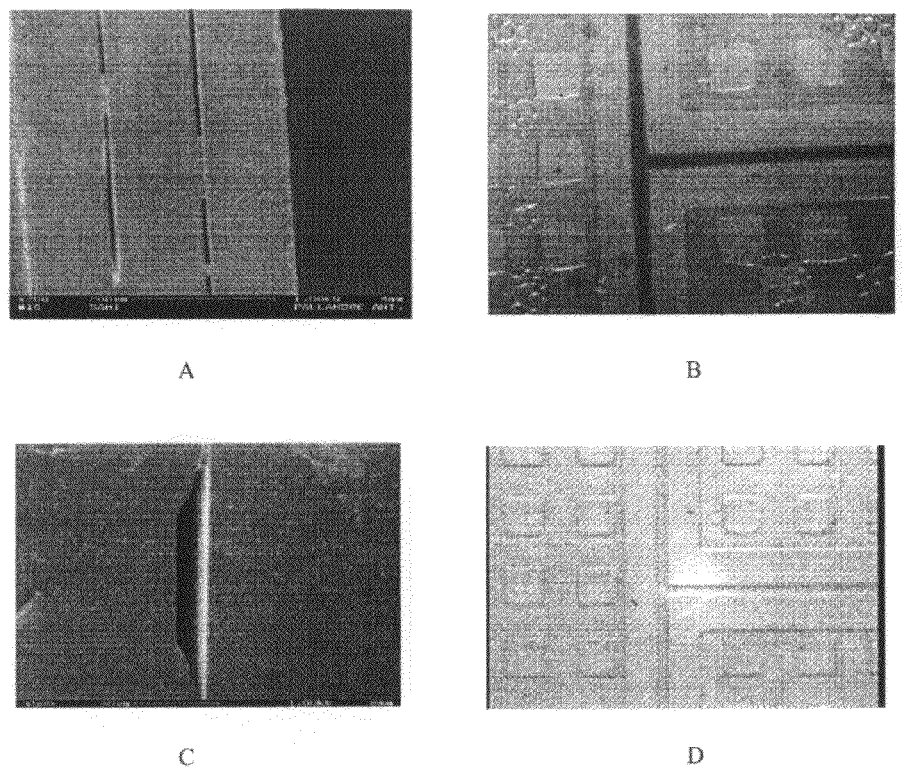
FIG. 2 represents SEM (scanning electron microscope) images of cryocuts and optical microscopy images of microchannels bonded by prior art solvent vapor assisted bonding (2A and 2B) and by the bonding assisted by the solvent system according to the invention (2C and 2D).

Concentrations of hexadecane ranging between 1% and 20% were tested. For this particular polymer, a concentration ranging from 7.5 to 10% (v/v) gave the optimal result. The process then followed as in example 7. The cryocut images (FIG. 2, C) shows a channel with a good, uniform thickness comparable with that of the initial microstructured substrate. FIG. 2D presents a transmission microscopy picture of a microchannel prepared with a template with "posts" according to U.S. Pat. No. 6,322,753. The structure of the posts is much better reproduced than in upper right panel, obtained according to comparative example 7.

Example 10

Use of an Inkpad for the Improvement of Bonding of Thermoplastic Polymer for the Preparation of Microchannels The protocol follows that described in example 9 except for the following modifications:

In a first step a slab of elastomer material (e.g. Poly(DiMethylSiloxane)) with one flat surface is be prepared by replication molding on a flat surface (e.g. polystyrene petri dish or gold coated silicon wafer). This slab is used as an inkpad. It is first immersed in hexadecane for 1 hour. Hexadecane diffuses and swells the elastomer material. After immersion, the excess of hexadecane is removed from the inkpad surface using a stream of pressured gas (e.g. nitrogen or argon). Next, the COC substrate is placed in close contact with the flat inkpad surface for 2 minutes. The COC substrate is then removed from the inkpad. The process then followed as in example 8 or example 9.

Example 11

Long Flexible Microchannel without Turn

Figure 3:
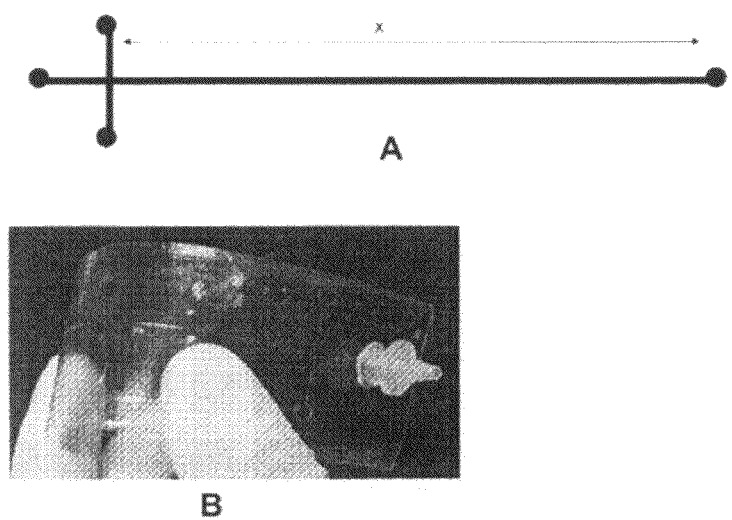
FIG. 3 represents the channel pattern (A) and a photograph (B) of a flexible chip with a cross pattern prepared in COC according to the invention, using examples 1 and 11. The separation channel is 50 µm wide, 55 µm deep and 10 cm long (x=10).

The preparation is performed as is example 9, except that a master (or template) with the structure presented in FIG. 3A, where 8 cm<X<30 cm, is used. This master is prepared as in example 1, except that the dry film resist is laminated on a large, 10×30 cm glass plate, and the plate with the mask fixed to it is translated at uniform speed under the illuminator lamp. The mask bears the negative of the microchannel, is drawn as presented in FIG. 3, upper panel. An exemplary embodiment is presented in FIG. 3B. The microfluidic system is flexible, continuously bendable, and optically transparent. In this particular embodiment, the separation channel is 50 μm wide, 55 μm deep and 10 cm long. Since the device is flexible, it can be bent to yield different 3D configurations depending on the particular application. The length of the separation channel can be arbitrarily chosen Example 12

Pressure Testing of the Bonding Between Two Substrates with a Liquid Solvent System of the Invention To test the strength of the bond, a single long channel was patterned in the COC film using a silica capillary (OD=436 μm) as the master and the channel was sealed by lamination similarly to example 8. The flexible substrate was cut to expose the end of the channel and a syringe needle was inserted into it. A cut pipette tip was inserted into the needle and Tygon® tubing was connected from the outlet of a nitrogen gas cylinder to the pipette tip. All joints were glued with toughened cyanoacrylate glue and cured overnight. The pressure regulator on the gas cylinder was opened gradually to pressurize the channel until the solvent-bonded parts ruptured. The microfluidic system prepared according to example 11, using a hexadecane/isopropanol ration of 7.5 or 10% v/v withstood a pressure of 3.5 bars, above which the device developed a leak.

Example 13

Injection of Polymer Separation Matrices and DNA Separation in a Microsystem According to the Invention A microfluidic network, with a double "T" shaped injector and a separation channel of 10 cm as described is prepared in a flexible COC microsystem following examples 1, 5, 6, 9 and 10. The microsystem is placed on an inverted microscope, equipped with epifluorescence excitation and a 20× objective.

A separation medium consisting in a copolymer of polyacrylamide with polydimethylacrylamide grafts, prepared according to Barbier et al. (Electrophoresis 2002, 23, 1441-1449) and containing SYBR green I (Molecular Probes) for DNA labelling, is introduced in the microfluidic system, by a syringe on a reservoir attached to the outlet of the separation channel. The filling of a 10 cm long, 55 μm thick microchannel with a high viscosity (3000 cP) polymer solutions suitable for DNA sequencing, in less than 5 mn. Then, DNA is injected in the T injector by "pinch injection" as described in Fu L-M. et al., (*Anal. Chem.* 2002, 74, 5084-5091) and separation is started. The field of the objective is moved to a detection point located close to the end of the separation channel (for instance 10 cm from the injection cross). The passage of DNA is observed by eye in the microscope, demonstrating the ability of performing injection and electrophoresis in long microchannels prepared according to the invention.

Example 14

Treatment of a COC Polymer Substrate for the Binding of Polyacrylic Acid as Third Material Inside a Microchannel A microfluidic network, with a single channel of 5.2 cm long and 55 μm thick is prepared in a flexible COC microsystem following examples 1 or 3 and 9. The microsystem is placed on a UV table (Vilber Lourmat) providing a maximum emission peak at 312 nm and illuminated for 30 minutes. Benzophenone (Sigma-Aldrich) as a photosensitizer were dissolved at 10% w/w in a solvent mixture consisting in 25% w/w dichloromethane as a good solvent for COC and benzophenone and 75% w/w ethyl acetate as a poor solvent for COC but a good solvent for benzophenone, and injected in the microchannel for 1 hour with a syringe pump. The microchannel was successively rinsed with ethyl acetate and deionized water. A photopolymerizable monomer solution (10% w/w acrylic acid in deionized water) was flowed for 15 min while the microchannel was illuminated with UV light through a mask to illuminate only one half of the channel. The microchannel was rinsed with 1000 times its volume to remove unbounded polymer chains. A 1% toluidine blue solution in TBE buffer, pH 8.5, was then flowed into the channel for 5 mn, and rinsing was achieved by flowing TBE buffer, pH 8.5, for 5 mn. The microchannel presented a strong blue color only where it had been exposed to light. The blue color revealed the presence of polyacrylic acid, which is negatively charged and binds the positively charged toluidine blue.

Example 15

Treatment of a COC Polymer Substrate for the Binding of Polyacrylic Acid as a Surface Modifier A 130 µm thick Topas 8007 cyclo-olefin copolymer (COCn Ticona GmbH) film was cleaned in isopropanol and dried in air It was placed on a UV table (Vilber Lourmat) providing a maximum emission peak at 312 nm and illuminated for 30 minutes. Benzophenone (Sigma-Aldrich) as a photosensitizer were dissolved at 10% w/w in a solvent mixture consisting in 25% w/w dichloromethane as a good solvent for COC and benzophenone and 75% w/w ethyl acetate as a poor solvent for COC but a good solvent for benzophenone, and the film was immersed in this solution for 30 mn. The film was successively rinsed ten times with ethyl acetate and deionized water. A photopolymerizable monomer solution (10% w/w acrylamide in deionized water) was flowed for 15 min while the microchannel was illuminated with UV light through a mask to illuminate only one half of the film. The film was extensively rinsed with water to remove unbounded polymer chains, and then let to dry. The film was then immersed into a 1% toluidine blue solution in TBE buffer, pH 8.5, and then extensively rinsed with water. The film presented a strong blue color only where it had been exposed to light. If the solvent system according to the invention was replaced by pure dichloromethane, the surface of the film was altered, and it became turbid and opaque during the treatment. If, on contrast, the solvent system of the invention was replaced by pure ethyl acetate, no colouring or only very weak coloring of the COC film could be observed.

The invention claimed is:

1. A method for bonding at least one part of a face of a first polymeric substrate to at least one part of a face of a second substrate, comprising:
    providing a first polymeric substrate and a second substrate,
    contacting the at least one part of the face of said first substrate with a liquid solvent system, said liquid solvent system containing:
        a first microcontact transfer solid compound, and
        a second compound having a low molecular weight that is able to swell and/or soften the polymeric material forming said face,
        wherein said first microcontact transfer solid compound is able to be swollen by said second compound, or to adsorb said second compound, or to be wetted by said second compound, and
    contacting the so-treated one part of the face of the first substrate with the at least one part of the face of said second substrate in conditions suitable to obtain their bonding.

2. The method according to claim 1, wherein the first substrate is formed from a polymeric material selected from the group consisting of thermoplastic polymers, crosslinked or non-crosslinked elastomers, and chemically crosslinked resins.

3. The method according to claim 1, wherein the first substrate is formed from a polymer selected from cyclic olefin polymers, cyclic olefin copolymers, polymers containing norbornene moieties, polymethylmethacrylate, acrylic polymers or copolymers, polystyrene, substituted polystyrene, polycarbonate, polyimide, silicone elastomers, fluoropolymers, polyolefins, epoxies, polyurethanes, polyesters, polyethylene terephtalate, polypersulfone, and polyether ketones.

4. The method according to claim 1, wherein at least one of said first and second substrates is rigid.

5. The method according to claim 1, wherein at least one of said first and second substrates is flexible.

6. The method according to claim 1, wherein said first substrate is a sheetlike substrate.

7. The method according to claim 1, wherein the second substrate is a sheetlike substrate.

8. The method according to claim 1, wherein either said first substrate or said second substrate or both, bear on their surfaces to be bonded, microstructures defining an integrated microchannel network, or an integrated microreservoir.

9. The method according to claim 1, wherein said first and second substrates are flexible.

10. A miniaturized hybridisation array obtained from a first polymeric substrate bonded to a second substrate by the method as defined in claim 1.

11. A miniaturized protein array obtained from a first polymeric substrate bonded to a second substrate by the method as defined in claim 1.

12. A template for embossing comprising:
    a supporting flexible layer bearing on at least one of its faces at least one microstructure made of a polymeric non-elastomer substrate, the template being configured to transfer a negative shape of said at least one microstructure onto a substrate.

13. The template according to claim 12, wherein said at least one microstructure is made of a photoresist or an UV glue, a thermoplastic polymer, a thermoset or a resin.

14. The template according to claim 12, wherein said template is configured to be affixed onto a roll used in roll embossing, or onto a band used in band embossing.

15. A method for fabricating a flexible microfluidic microsystem comprising the steps of the method according to claim 1.

* * * * *